*Olney, Logan & Fisher,*
*Nut Lock,*
Nº 82,473. Patented Sep. 22, 1868.
Fig: 1.
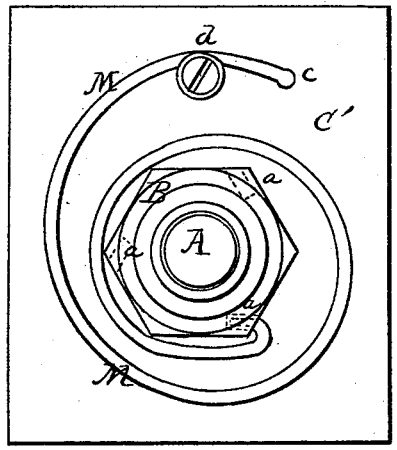
Fig: 2.
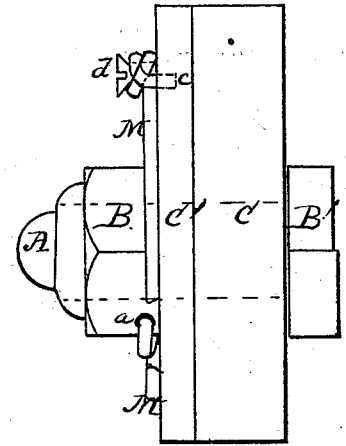
Witnesses.
Inventors.

UNITED STATES PATENT OFFICE.

H. W. OLNEY, R. R. LOGAN, AND J. H. FISHER, OF ALLEGHENY, PA.

IMPROVEMENT IN LOCK-NUTS AND TIGHTENERS.

Specification forming part of Letters Patent No. 82,473, dated September 22, 1868.

*To all whom it may concern:*

Be it known that we, H. W. OLNEY, R. R. LOGAN, and J. H. FISHER, of Allegheny city, in the county of Allegheny and State of Pennsylvania, have invented a new and Improved Nut-Lock; and we do hereby declare that the following is a full, clear, and exact description of the construction and operation of the same, reference being had to the accompanying drawings, making a part of this specification, in which—

Figure 1 is a front view. Fig. 2 is a side view.

This invention has for its object to provide a simple, cheap, and effective device by which the screw-nuts used on bolts can be securely locked, so that no vibration of the bolts will loosen or remove the nuts; and also, in case of shrinkage or wear of the iron or wood through which the bolts pass, to keep the nuts up to the work, and thus prevent them from becoming loose.

In the drawings, A indicates the bolt; B B', the screw-nuts that hold it in place; and C C', the materials through which the bolt is driven, and which it holds together.

Holes $a\ a\ a$ are drilled in the edges of the nut, and a strong wire spring, M, has its end inserted in one of these holes, and thence passes around the nut once or more, as shown in the drawings, and into the part C', at $c$. Before it reaches the point $c$, where it is fastened to the plate C', it may be made to pass around a screw, $d$, by which it is prevented from springing off from said plate. The whole device is exceedingly simple, cheap, and effective. It can be readily and conveniently applied, and will lock the nut so securely that no amount of jar or wear will cause it to turn and loosen the parts which the bolt holds together.

The spring M is so coiled around the nut B and fastened to the part C as to be on a strain tending to turn the nut in the direction which tightens the same, and thus when the iron or wood through which the bolt passes becomes either shrunk or worn so as to loosen the nut, it is turned by the action of the spring M, and thus kept up to the work and prevented from becoming loose.

Having thus described our invention, what we claim as new, and desire to secure by Letters Patent, is—

The nut-lock and tightener above described, consisting essentially of the coiled spring M, bent and attached to the nut and the part C in the manner shown, and operating in connection with a screw, $d$, substantially as described.

H. W. OLNEY.
R. R. LOGAN.
J. H. FISHER.

Witnesses:
W. J. BLACKSTOCK,
ED. D. LINDSAY.